Patented Jan. 16, 1940

2,187,467

UNITED STATES PATENT OFFICE 2,187,467

CEVITAMATE SOLUTION

Elmer H. Stuart, Indianapolis, Ind., assignor to Eli Lilly and Company, Indianapolis, Ind., a corporation of Indiana No Drawing. Application February 11, 1939, Serial No. 256,008

7 Claims. (Cl. 167—81)

It is the object of my invention to provide a stable solution of Vitamin C salts.

Vitamin C has now been isolated and identified, as cevitamic acid, otherwise called ascorbic acid. It is fairly stable in solid form, in which form it may readily be used for oral administration. But both cevitamic acid and its salts are quite unstable in aqueous solution, which form is desirable for parenteral administration, and tend to decompose with consequent loss of potency and even the formation of toxic substances.

Various attempts have been made to produce stable solutions of cevitamic acid and its salts, but heretofore they have met with rather poor success. In consequence, although solutions of cevitamic acid and of its salts are on the market in solution form, it has heretofore been the consensus that to insure full potency and freedom from toxicity it was necessary for the physician to make his own solution just prior to parenteral administration.

I have now been able to produce stable aqueous solutions of salts of cevitamic acid. My aqueous solutions of those salts will withstand boiling for considerable periods of time, so that ampoules containing the solution may be given the three half-hour boilings on three successive days that is one of the accepted procedures for producing sterility in solutions. In addition, my aqueous solutions may be kept at elevated temperatures, such as 130° F., for several weeks without noticeable discoloration or loss of potency; whereas all previous aqueous Vitamin C solutions of which I am aware will soon darken at that temperature.

Although cevitamic acid itself is readily water-soluble, I have not been able to produce this stabilization of aqueous solutions of the acid itself, but only of its salts. In addition, in order to get full stabilization of aqueous solutions even of the salts of cevitamic acid, I find it desirable that the hydrogen ion concentration be kept close to neutrality.

In obtaining this stabilization, I provide in an aqueous solution of a suitable salt of cevitamic acid a sulfur-containing reducing agent of the class consisting of sulfur dioxide, sulfur-containing acids which are capable of yielding sulfur dioxide, and soluble salts of such sulfur-containing acids; and adjust the solution to approximately pH 7. The sulfur-containing reducing agent may be put in the solution before the salt of cevitamic acid is put there, and that salt of cevitamic acid may even be formed in the solution by reaction between cevitamic acid and the desired base. The salts of cevitamic acid with which my invention is concerned are the alkali-metal salts, principally sodium, the alkaline-earth salts, principally calcium, the ammonium salts, and the lower-alkyl-substituted ammonium salts, such as the monoethanolamine salts and the ethylenediamine salts.

Examples of my stabilized solutions of salts of cevitamic acid are as follows:

*Example 1:*

| | | |
|---|---|---|
| Cevitamic acid | 5 | grams |
| Sodium carbonate, monohydrated | 1.75 | grams |
| Sodium meta-bisulfite | 0.5 | grams |
| Distilled water | 210 | cc. |

The first three ingredients are ground together in dry state, and then added to the water. In the solution thus formed, the sodium carbonate and cevitamic acid react to form sodium cevitamate and carbon dioxide, and while some of the carbon dioxide at once goes off as a gas part of it remains in solution. To get rid of that latter portion of carbon dioxide, and of any free sulfur-dioxide gas that may be liberated from the sodium meta-bisulfite, the solution is subjected to evaporation, desirably in vacuo, to reduce the volume to about 195 cc. The reduced-volume solution is then adjusted closely to pH 7.0, by adding the small quantity of additional sodium carbonate that is needed to do that, and evaporating after each such addition to make sure of freedom from dissolved carbon dioxide. A convenient indicator is bromthymol blue.

When the desired pH has been obtained, after the final evaporation, enough distilled water is added to make 200 cc., and then the solution may be put into and sealed in ampoules, and the sealed ampoules subjected to boiling for a half-hour period on each of three successive days for sterilization. A convenient ampoule size is 2 cc.; which makes each ampoule contain 50 milligrams of cevitamic acid (present as the sodium salt), representing 1000 international units of Vitamin C.

The sodium meta-bisulfite present in the solution acts effectively to keep the solution stable.

*Example 2:*

| | | |
|---|---|---|
| Cevitamic acid | 5 | grams |
| Sodium carbonate, monohydrated | 1.75 | grams |
| Dry sodium sulfite | 0.5 | grams |
| Distilled water | 100 | cc. |

The first three ingredients are ground together in a dry state, and then dissolved in the water. The whole is then evaporated, desirably in vacuo, to about 90 cc., a little additional sodium carbonate is added as may be needed to produce a close approximation to pH 7.0, with evaporation after each addition of sodium carbonate, and distilled water is added as necessary to make the volume 100 cc. This may be put into 2 cc. ampoules, and sterilized as before. Each such ampoule then contains 100 milligrams of cevitamic acid (present as the sodium salt), representing 2000 international units of Vitamin C.

The sodium sulfite acts effectively to keep the solution stable.

*Example 3:*

| | |
|---|---|
| Cevitamic acid | 5 grams |
| Sodium carbonate, monohydrated | 1.75 grams |
| Sodium hyposulfite | 0.5 grams |
| Distilled water | 100 grams |

The procedure outlined for Examples 1 or 2 is followed, to get a final solution of such concentration of cevitamic acid as may be desired, and the solution is put up in suitable ampoules. The sodium hyposulfite acts effectively to keep the solution stable.

*Example 4:*

| | |
|---|---|
| Cevitamic acid | 10 grams |
| Calcium hydroxide | 2.1 grams |
| Sodium meta-bisulfite | 0.2 grams |
| Water | 90 cc. |

The cevitamic acid and the sodium meta-bisulfite are dissolved in the water, and the calcium hydroxide is then slowly added. When all of the calcium hydroxide specified has been added, the solution is still slightly acid. Then a little additional calcium hydroxide is added very slowly, and mixed thoroughly, until a faint purple color appears, at which time it is found that the solution is very slightly alkaline. At this point I add 0.1 grams more of sodium meta-bisulfite; which causes the color to disappear, and makes the solution very slightly acid, about pH 6.9, which is sufficiently close to neutrality. The solution is filtered, to remove any insoluble matter; and then distilled water is added to produce the volume desired. If that volume is 100 cc., then each cc. contains 100 mg. of cevitamic acid (present as the calcium salt), representing 2000 international units of Vitamin C.

The sodium meta-bisulfite acts effectively to keep the solution stable.

*Example 5:*

| | |
|---|---|
| Cevitamic acid | 5 grams |
| Monoethanolamine approximately | 1.7 cc. |
| Sodium meta-bisulfite | 0.5 grams |
| Distilled water | 90 cc. |

The cevitamic acid and the sodium meta-bisulfite are dissolved in the water, and the monoethanolamine is then added slowly until a sufficient amount has been added to produce approximately pH 7.0, as indicated by bromthymol-blue. To the solution thus obtained I then add distilled water in sufficient quantity to produce the desired volume, say 100 cc.; and the solution is then desirably filtered. The solution is put in ampoules, which are sterilized as in other examples. The solution is almost but not quite colorless, although the discoloration is not noticeable in small ampoules.

The sodium meta-bisulfite acts effectively to keep the solution stable.

*Example 6:*

Instead of using sodium or calcium or monoethanol amine as the base for the cevitamate, I may use other bases; such for instance as the other alkali metals, the other alkaline-earth metals, and other lower-alkyl amines, or ammonia. In using them, it is simply necessary to add the appropriate carbonate or hydroxide or amine. But, ordinarily, I consider that the sodium salt is probably the best for parenteral administration, and that the calcium salt is the next best. I prefer to form the desired salt of cevitamic acid in the solution, instead of attempting to add that salt in dry form to the water, as there is a very strong tendency for the salts of cevitamic acid to discolor and decompose when attempts are made to get them in dry form. In addition, I prefer to have the sulfur-containing reducing agent present in the solution during the formation of the salt from the cevitamic acid, instead of obtaining or forming the salt first and then adding the reducing agent afterwards.

In all the examples which I have given I have used the sodium salt of a sulfur-containing acid as the reducing agent. But other salts of such acids may be used, or the acids themselves may be used; and, in addition, sulfurdioxide itself may be used; although that is less convenient in manipulation. The sodium sulfite, the sodium meta-bisulfite, and the sodium hyposulfite which are mentioned in the examples, as well as the sodium bisulfite which may also be used, may all be referred to as sodium salts of sulfite acids.

The precise proportions given in the examples are given strictly as examples, and may be varied as desired.

I claim as my invention:

1. An aqueous solution of a cevitamate of a base of the class consisting of the alkali metals, the alkaline-earth metals, ammonium, and the lower-alkyl-substituted amines, which solution also contains a sulfur-containing reducing agent of the class consisting of sulfur dioxide, sulfur-containing acids which are capable of yielding sulfur dioxide, and soluble salts of such sulfur-containing acids.

2. An aqueous solution of sodium cevitamate, which solution also contains a sulfur-containing reducing agent of the class consisting of sulfur dioxide, sulfur-containing acids which are capable of yielding sulfur dioxide, and soluble salts of such sulfur-containing acids.

3. An aqueous solution of a cevitamate of a base of the class consisting of the alkali metals, the alkaline-earth metals, ammonium, and the lower-alkyl-substituted amines, which solution also contains a soluble salt of a sulfite acid.

4. An aqueous solution of sodium cevitamate, which solution also includes a soluble salt of a sulfite acid.

5. An aqueous solution of a cevitamate of a base of the class consisting of the alkali metals, the alkaline-earth metals, ammonium, and the lower-alkyl-substituted amines, which solution also contains the sodium salt of a sulfite acid.

6. An aqueous solution of sodium cevitamate, which solution also includes the sodium salt of a sulfite acid.

7. An aqueous solution of a cevitamate as set forth in claim 1, with the addition that the hydrogen ion concentration of the solution is close to the neutral value of pH 7.

ELMER H. STUART.